United States Patent [19]
Korten

[11] 3,948,205
[45] Apr. 6, 1976

[54] DIRECTIONAL FINIAL INDICATOR

[75] Inventor: Chauncy F. Korten, Ann Arbor, Mich.

[73] Assignee: Ridge Associates, Ann Arbor, Mich.

[22] Filed: Aug. 15, 1974

[21] Appl. No.: 497,521

[52] U.S. Cl............ 116/35 R; 40/129 C; 40/145 R;
116/30; 116/173; 350/97
[51] Int. Cl.²..................... B60Q 1/26; G09F 17/00
[58] Field of Search.......... 116/35 R, 45, 28 R, 173, 116/30; 40/128, 129 C, 145; 350/97, 307; 273/34

[56] References Cited
UNITED STATES PATENTS

| | | | |
|---|---|---|---|
| 2,802,443 | 8/1957 | Hanson............................. | 116/28 X |
| 2,906,234 | 9/1959 | Scott................................. | 40/128 X |
| 3,059,362 | 10/1962 | Scherotto......................... | 40/145 R |
| 3,286,386 | 11/1966 | Glantz............................... | 40/129 C |
| 3,292,569 | 12/1966 | Trigilio ............................. | 350/99 X |
| 3,377,117 | 4/1968 | Biscow.................................. | 350/97 |
| 3,636,912 | 1/1972 | Kamp............................. | 40/129 C X |
| 3,686,938 | 8/1972 | Binckley ........................... | 116/28 R |
| 3,812,815 | 5/1974 | Kuenzel ............................ | 116/28 UX |
| D45,931 | 6/1914 | Gilbert............................. | 40/154 UX |

*Primary Examiner*—Richard C. Queisser
*Assistant Examiner*—Daniel M. Yasich
*Attorney, Agent, or Firm*—Whittemore, Hulbert & Belknap

[57] ABSTRACT

A pliable, directional, protective finial comprising an initially substantially flat resilient member having a longitudinal axis of symmetry, a first geometric shape at the top thereof providing different color indications toward the front and back of the finial in installation, and a pair of geometric shapes at the bottom thereof on opposite sides of the axis of symmetry adapted to be placed in alignment on folding of the bottom of the finial about a finial shaft, structure for securing the end of the shaft to the resilient member adjacent the upper geometric shape and for holding the bottom of the finial on the finial shaft in position folded about the shaft along the longitudinal axis of symmetry thereof. The geometric shapes are of direction indicating colors which are light reflective, and the finial is inherently aerodynamically stable in the folded position whereby correct directional information is assured.

17 Claims, 15 Drawing Figures

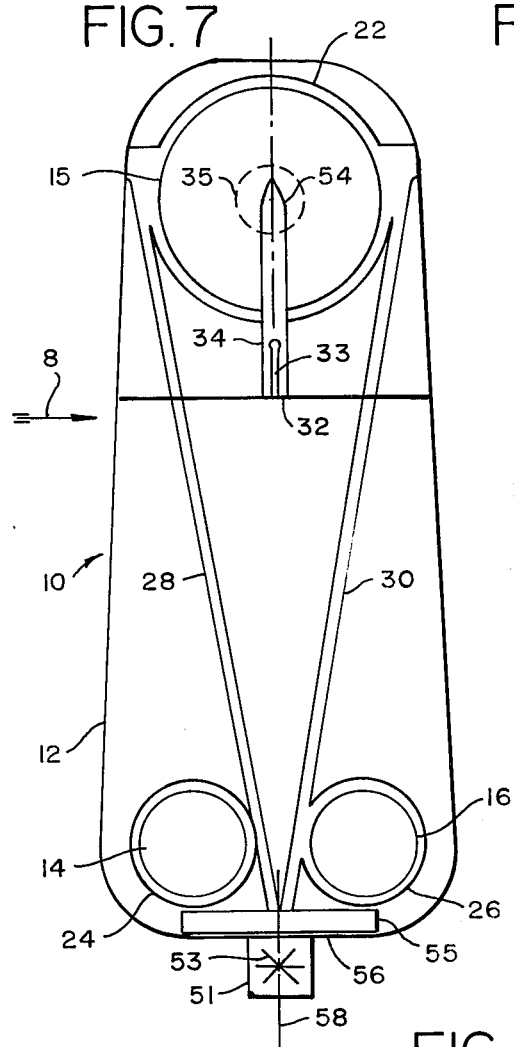
FIG. 7
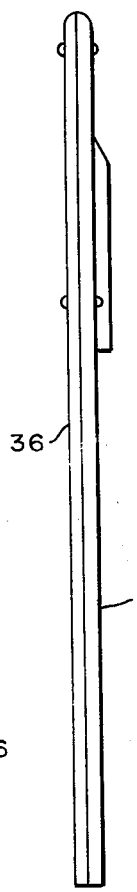
FIG. 9
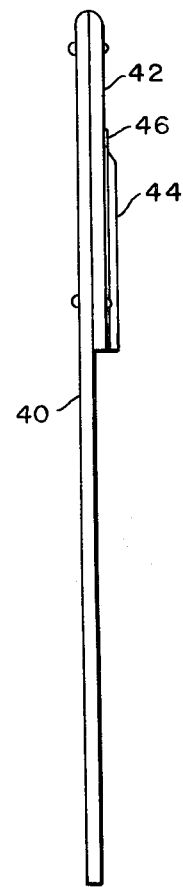
FIG. 10
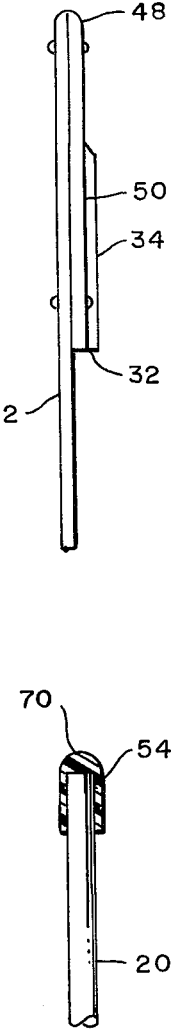
FIG. 8
FIG. 14
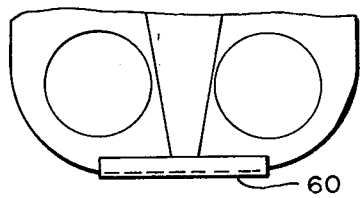
FIG. 11
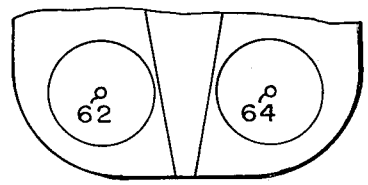
FIG. 12
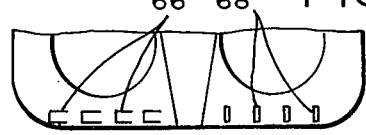
FIG. 13
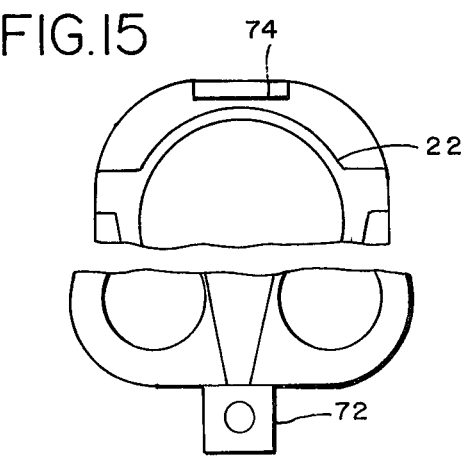
FIG. 15

DIRECTIONAL FINIAL INDICATOR

BACKGROUND OF THE INVENTION

1. Field of the Invention

The invention relates to finials and refers more specifically to a finial for use with vehicles, boats, bicycles or the like, to provide a reflective indicator of the direction the finial is facing with respect to the direction of an observer.

2. Description of the Prior Art

In the past, a number of different devices have been utilized on shafts in conjunction with vehicles, boats, bicycles and the like, to provide messages, some of which have been directional. Thus, bright-colored balls have been used on automobile antennas to aid in the location of automobiles parked in large parking lots. Further, triangular flags have been used in conjunction with shafts on bicycles to provide a highly visible indicator for protection of bicycle riders. Also, flags and colored lights have long been used on both boats and aircraft to provide a visual indication of the presence of and direction of heading of such craft. However, such balls, flags and lights have had the disadvantage of giving the same indication regardless of the direction from which they are viewed.

SUMMARY OF THE INVENTION

The invention comprises a pliable, directional, protective finial particularly adapted for use with bicycles, boats, automobiles, and the like, to provide a visual indication of the direction in which a vehicle is facing and/or traveling. The finial of the invention comprises an initially substantially flat, pliable sheet which may be of clear plastic having a geometric shape of highly reflective material at the top thereof which is colored differently on the front and rear faces of the pliable sheet as, for example, white on the front and red on the back, and having a pair of geometric shapes, again of highly reflective nature, at the bottom on either side of an axis of symmetry thereof which are adapted to be aligned on folding of the bottom of the finial along the axis of symmetry thereof to provide, for example, amber-colored indicators substantially perpendicular to the indicator at the top of the finial to indicate the sides of the vehicle.

The pliable sheet may be formed of two separate full sheets, heat sealed together around the edges thereof and around the geometric shapes. Alternatively, the pliable sheet may consist of a first full sheet and a second partial sheet extending only over the upper geometric shape and heat sealed to the first pliable sheet around the edges of the second pliable sheet and the upper geometric shape. Alternatively, a single flat sheet may be used and a full or partial second pliable sheet may be integrally formed by folding the first pliable sheet about a transverse fold line thereacross.

The finial of the invention is assembled on a finial shaft by means of a slot and bead formed in or attached to the pliable sheet at the upper geometric shape for receiving the end of the shaft, and structure for securing the bottom of the finial in a position folded around the upper end of the finial shaft with the geometric shapes at the bottom of the finial in alignment.

In accordance with the invention, the structure for securing the finial in the folded position may take the form of a tab at the bottom of the finial having an opening therethrough for receiving the shaft, a spring clip, a strippable tape or a strip of soft metal secured to the finial at the bottom thereof, rivet holes through the center of the lower geometric shapes, or tongue and slot structures cut adjacent the bottom of the pliable sheet on opposite sides thereof.

A reinforcing disc and/or a bulb-shaped tip for the finial shaft may be provided to prevent the end of the shaft from working through the finial.

Also, a hook structure may be formed in the one end of the pliable sheet to permit hanging of the finials for display purposes, and a slot may be provided in one of the layers of the pliable sheet to permit insertion therein of advertising literature and/or installation instructions for the finial.

BRIEF DESCRIPTION OF THE DRAWINGS

FIG. 7 is a front view of the finial illustrated in FIGS. 1 and 2 prior to installation thereof on the finial shaft.

FIG. 8 is a side view of the finial illustrated in FIG. 7, taken in the direction of arrow 8 in FIG. 7.

FIG. 9 is a side view of a modified finial structure.

FIG. 10 is a side view of another modified finial structure.

FIG. 11 is a partial front view of modified finial structure.

FIG. 12 is a partial front view of another modified finial structure.

FIG. 13 is a partial front view of still another modified finial structure.

FIG. 14 is a section view of a cap for use on the finial shaft.

FIG. 15 is a plan view of a still further modification of the finial structure illustrated in FIG. 1.

DESCRIPTION OF THE PREFERRED EMBODIMENTS

Figure 1:
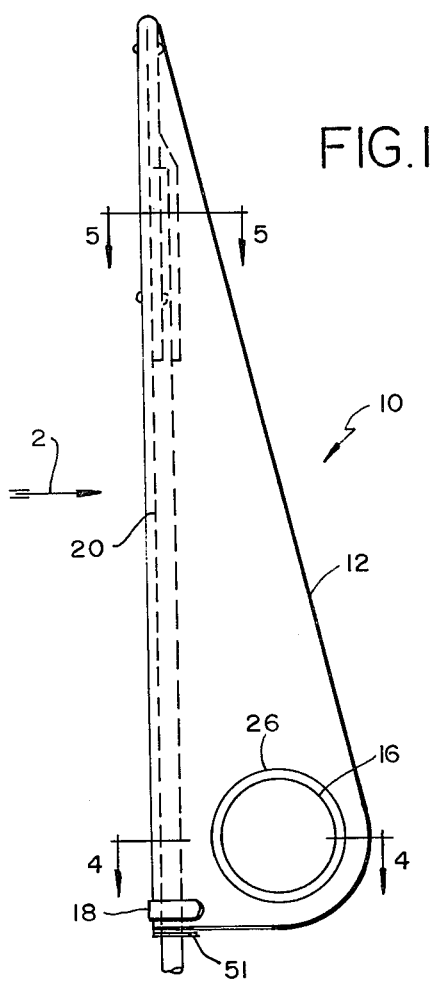
FIG. 1 is a side view of a pliable, directional, protective finial constructed in accordance with the invention in position on a finial shaft.
Figure 2:
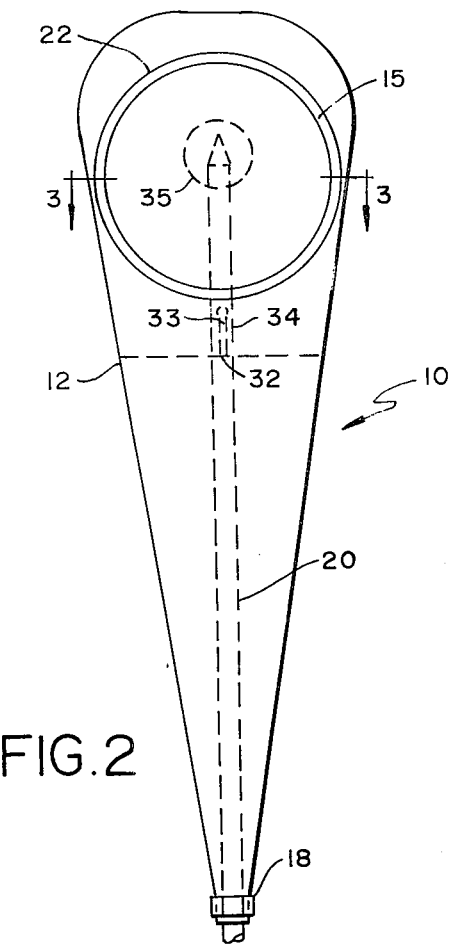
FIG. 2 is a front view of the finial illustrated in FIG. 1, taken in the direction of arrow 2 in FIG. 1.

The pliable, directional, protective finial 10 illustrated in FIGS. 1–8 includes a pliable sheet 12 which, as shown best in FIG. 7, is originally produced substantially flat, and the geometric shapes 14, 15 and 16. The resilient spring clip 18, best shown in FIG. 6, in conjunction with the finial 10, is provided to secure the bottom 56 of the finial 10 to the finial shaft 20, as shown in FIGS. 1 and 2.

The pliable sheet 12 is shaped as shown in FIG. 7 and includes the circle 22 for the upper geometric shape and the circles 24 and 26 for the lower geometric shapes 14 and 16. The pliable sheet may be, for example, clear plastic such as polyethylene sufficiently pliable to permit folding as subsequently indicated. The circles 22, 24 and 26 may be raised or offset from the sheet slightly to accommodate placing the geometric shapes 14, 15 and 16 on the pliable sheet.

The pliable sheet 12 is further provided with fold lines 28 and 30, as shown, along which the sheet 12 may be folded into the position shown in FIGS. 1 and 2 in installation. The lines 28 and 30 may be heat seal lines or serrations, or the like.

A slot 32 and a bead 34 are further provided in the sheet 12 as shown to receive the end of the finial shaft 20. Again, the bead 34 may be an offset portion of the plastic formed in molding, and as shown in FIG. 7 is provided with a slot 33 to receive a bicycle flag if the shaft is equipped with a flag. A reinforcing disc 35 of plastic may be sealed or adhered to the sheet 12, as shown in FIG. 7, if desired, to prevent a finial shaft from working through sheet 12.

Figure 3:
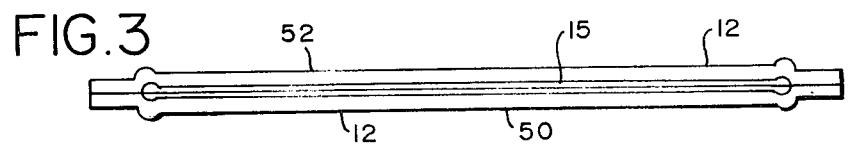
FIG. 3 is an enlarged section view of a portion of the finial illustrated in FIG. 2, taken substantially on the line 3—3 in FIG. 2.
Figure 4:
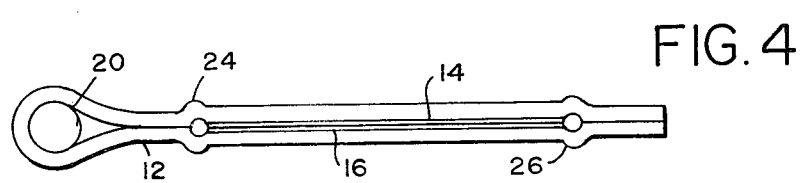
FIG. 4 is an enlarged section view of the finial illustrated in FIG. 1, taken substantially on the line 4—4 in FIG. 1.
Figure 5:
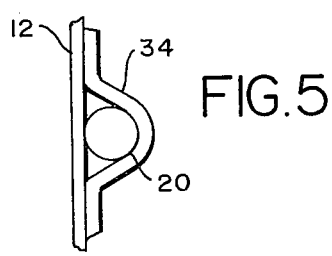
FIG. 5 is an enlarged partial section view of the finial illustrated in FIG. 1, taken substantially on the line 5—5 in FIG. 1.
Figure 6:
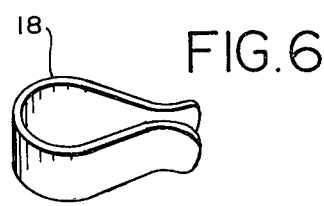
FIG. 6 is an enlarged perspective view of the spring clip utilized in securing the finial of FIG. 1 to the finial shaft.

A strippable length of adhesive tape 55 for securing the sheet in a folded condition about a finial shaft is provided at the bottom of the sheet 12, and a tab 51 is formed on the bottom of sheet 12, including slots cut therein as shown in FIG. 3, to provide an opening through which a finial shaft may be inserted in assembly of the finial on a shaft as shown in FIG. 1.

The pliable sheet 12, as shown in FIG. 8, may be formed from a single sheet which is folded as at 48 to provide a short second sheet 50 along with a first full pliable sheet 52 having the overall dimensions as shown in FIG. 7.

Alternatively, as shown in FIG. 9, the pliable sheet 12 may be formed of a first sheet 36 and a second sheet 38, each of which have the exact overall dimensions as shown in FIG. 7. The sheets 36 and 38 are heat sealed together about the periphery of the circles 22, 24 and 26 and about the outer periphery of the sheets.

As shown in FIG. 10, the sheets 12 may also have a construction in which a first sheet 40 has the overall dimensions shown in FIG. 7, while the second sheet 42 is shortened so that it extends just below the circle 22. In this case, the bead may be provided as a separate plastic member 44 having an exterior flange 46 therearound by which it is heat sealed to the plastic sheet 42.

In any case, the upper geometric shape 15 may be provided by painting the inner surface of the two separate sheets 50 and 52 or by applying, for example, a disc of colored material to the sheets 50 and 52 within the circle 22. It is desirable that such discs be, for example, white toward the front of the finial and red toward the back of the finial and be light-reflecting or luminescent. The painting or the discs may be internally applied prior to the sealing of the sheets 50 and 52 together or may be externally applied later.

The lower geometric shapes 14 and 16 may similarly be either painted within the circles 24 and 26 or may be discs of colored material secured within the circles 24 and 26. In keeping with the usual convention, the lower discs 14 and 16 may be amber in color and, as shown with relation to FIGS. 1 and 2, are aligned with each other with the finial installed and extend perpendicularly to the upper geometric shape 15.

In installation, the tip 54 of the shaft 20 is inserted through slots 53 in the tab 51 and into the bead 34 through the opening 32 with the flag, if any, on the shaft passing through slot 33, the protective cover is stripped from the tape 55, and the bottom 56 of the finial 10 is folded around the shaft 20 about the axis of symmetry 58 of the finial 10 to align the geometric shapes 14 and 16. The bottom 56 of the finial 10 is secured in the folded position by the tape 55.

Alternatively, or in addition to the tape 55, the spring clip 18 may be positioned over the folded finial 10 and the shaft 20, as shown best in FIGS. 1 and 2, to insure the bottom of the finial is secured to the finial shaft around which it is folded.

A strip of soft metal such as aluminum or untempered steel 60 may be secured to the bottom of the pliable sheet 12, as shown in FIG. 11, by convenient means such as adhesive or the like in place of tape 55. With such construction, on folding of the bottom 56 of the finial 10 about the shaft 20, the bottom of the finial will remain in the folded position since the soft metal 60 has no tendency to return to its unfolded position.

In the modified finial structure illustrated in FIG. 12, after folding of the finial bottom 56 about the shaft 20, a rivet is passed through the aligned openings 62 and 64 to secure the finial 10 in its folded condition. It would also be possible to use staples instead of rivets to hold the bottom of the finial in its folded position, in which case the rivet holdes 62 and 64 would not be necessary.

In the modified finial structure of FIG. 13, straps or tongues are cut out of the finial adjacent the bottom thereof, and in the folded position of the finial, the tongues 66 fit within the slots 68 cut in the opposite side of the bottom of the finial.

As shown best in FIG. 14, a bulb-shaped soft tip 70 may be provided in conjunction with the finial 10 and shaft 20 to prevent the tip 54 of the shaft 20 from tearing the pliable sheet 12 of the finial 10 is assembly therewith. The tip 70 may be of any desirable soft material such as plastic or rubber.

As shown best in FIG. 15, a hook 72 may be formed on the pliable sheet 12 at the bottom thereof. The hook may be used to hang the finial 10 for display purposes to aid in sales thereof.

Also as shown in FIG. 15, a slot 74 may be provided between the sheets 50 and 52, which slot permits the insertion of advertising material and/or installation instructions for the finial between the sheets which, as previously indicated, may be transparent. Wherein such slot is used at the top of the finial, as shown in FIG. 15, the heat sealing around the circle 22 may be eliminated.

While one embodiment of the invention has been considered in detail, it will be understood that other embodiments and modifications are contemplated. For example, it is preferred that the finial be used without a flag on a bicycle. However, the finial has been disclosed in a preferred embodiment which permits use of the finial with shafts having flags thereon. It is the intention to include all such embodiments and modifications as are defined by the appended claims within the scope of the invention.

What I claim as my invention is:

1. A pliable, directional, protective finial comprising an initially substantially flat, pliable sheet of material having a top and a bottom and a longitudinal axis of symmetry extending between the top and bottom, a separately distinguishable geometric shape visual indicator at the top of the pliable sheet and a pair of separately distinguishable geometric shape visual indicators at the bottom of the pliable sheet on opposite sides of the axis of symmetry, a shaft having an upper, free one end and another end adapted to be mounted to an object which is selectively movable, and means securing the pliable sheet to said one free end of the shaft and extending along the axis of symmetry thereof with the geometric shaped indicator at the top of the pliable sheet extending in one direction so as to provide front and rear indications and with the bottom of the pliable sheet wrapped around the shaft so that the bottom geometric shapes are aligned and extend perpendicularly to the geometric shape at the top of the pliable sheet to provide side indications, the width of the top of the pliable sheet having a wider dimension than the wrapped bottom and said visual indicator providing an indication of the location of the object.

2. Structure as set forth in claim 1 wherein the pliable sheet is constructed of two separate sheets of material heat sealed together around the periphery of each of the geometric shapes and around the periphery of the separate sheets.

3. Structure as set forth in claim 1 wherein the pliable sheet comprises a first full pliable sheet and a second pliable sheet secured to the first pliable sheet at the top of the first pliable sheet so as to extend over the top geometric shape.

4. Structure as set forth in claim 1 wherein the pliable sheet is a single sheet and is folded at the top to provide a double thickness at the top between which the top geometric shape is positioned.

5. Structure as set forth in claim 1 wherein the geometric shapes are colored discs adhered to the pliable sheet.

6. Structure as set forth in claim 1 wherein the geometric shapes are colored and are light reflective.

7. Structure as set forth in claim 1 wherein the pliable sheet is provided with impressions defining the portions thereof receiving the geometric shapes.

8. Structure as set forth in claim 1 wherein the means for securing the pliable sheet to the shaft includes a slot and bead structure extending longitudinally of the axis of symmetry thereof so that the end of the shaft may be extended through the slot and into the bead.

9. Structure as set forth in claim 1 wherein the means for securing the pliable sheet to the shaft includes separate bead structure secured to the pliable sheet on the axis of symmetry thereof for receiving the end of the shaft therein.

10. Structure as set forth in claim 1 wherein the means for securing the pliable sheet to the shaft includes a C-shaped spring clip 18 adapted to be positioned over the sheet and shaft adjacent the bottom thereof with the finial folded over the shaft about the axis of symmetry thereof.

11. Structure as set forth in claim 1 wherein the means for securing the pliable sheet to the shaft includes a non-resilient soft metal band secured to the sheet transversely of the axis of symmetry thereof adapted to be folded around the end of the shaft with the bottom of the sheet.

12. Structure as set forth in claim 1 wherein the means for securing the pliable sheet to the shaft includes rivet openings extending through the center of the geometric shapes at the bottom of the sheet for receiving a rivet extending therethrough on folding of the sheet about the shaft to place the bottom geometric shapes in alignment with each other.

13. Structure as set forth in claim 1 wherein the means for securing the pliable sheet to the shaft includes at least one tongue cut from one side of the bottom of the sheet and at least one corresponding slot cut in the other side of the bottom of the sheet whereby the tongue will fit within the slot on folding of the bottom of the sheet around the shaft along the axis of symmetry thereof.

14. Structure as set forth in claim 1 and further including a tip fitting over the end of the shaft to prevent piercing of the finial with the end of the shaft.

15. Structure as set forth in claim 1 wherein the pliable sheet is formed with a hook at the top thereof to permit hanging of the finial for sales display.

16. Structure as set forth in claim 1 and further including a slot in the pliable sheet whereby advertising literature, installation directions and the like may be placed within the finial for sales display.

17. A pliable, directional, protective finial comprising an intially substantially flat composite pliable sheet of material having a top and a bottom and a longitudinal axis of symmetry extending between the top and bottom which composite pliable sheet is constructed of two separate sheets of material the first of which is a whole pliable sheet and the second of which is a partial pliable sheet positioned in contact with the first pliable sheet at the top of the first pliable sheet, a separately distinguishable geometric shape visual indicator at the top of the composite pliable sheet and a pair of separately distinguishable geometric shape visual indicators at the bottom of the composite pliable sheet on opposite sides of the axis of symmetry thereof, said first pliable sheet and second pliable sheet being heat sealed together around the periphery of the geometric shape visual indicator at the top of the composite pliable sheet and about the periphery of the second, pliable sheet, a shaft having an upper free one end and another end adapted to be mounted to an object which is selectively movable and means for securing the composite pliable sheet to said one free end of the shaft and extending along the axis of symmetry thereof with the geometric shaped indicator at the top of the composite pliable sheet extending in one direction so as to provide front and rear indications and with the bottom of the composite pliable sheet wrapped around the shaft so that the bottom geometric shapes are aligned and extend perpendicularly to the geometric shape at the top of the composite pliable sheet to provide side indications, the width of the top of the pliable sheet having a wider dimension than the wrapped bottom and said visual indicator providing an indication of the location of the object.

* * * * *